Dec. 27, 1938.  W. H. HALL, JR  2,142,025
LOOM
Filed Oct. 13, 1936  8 Sheets-Sheet 3
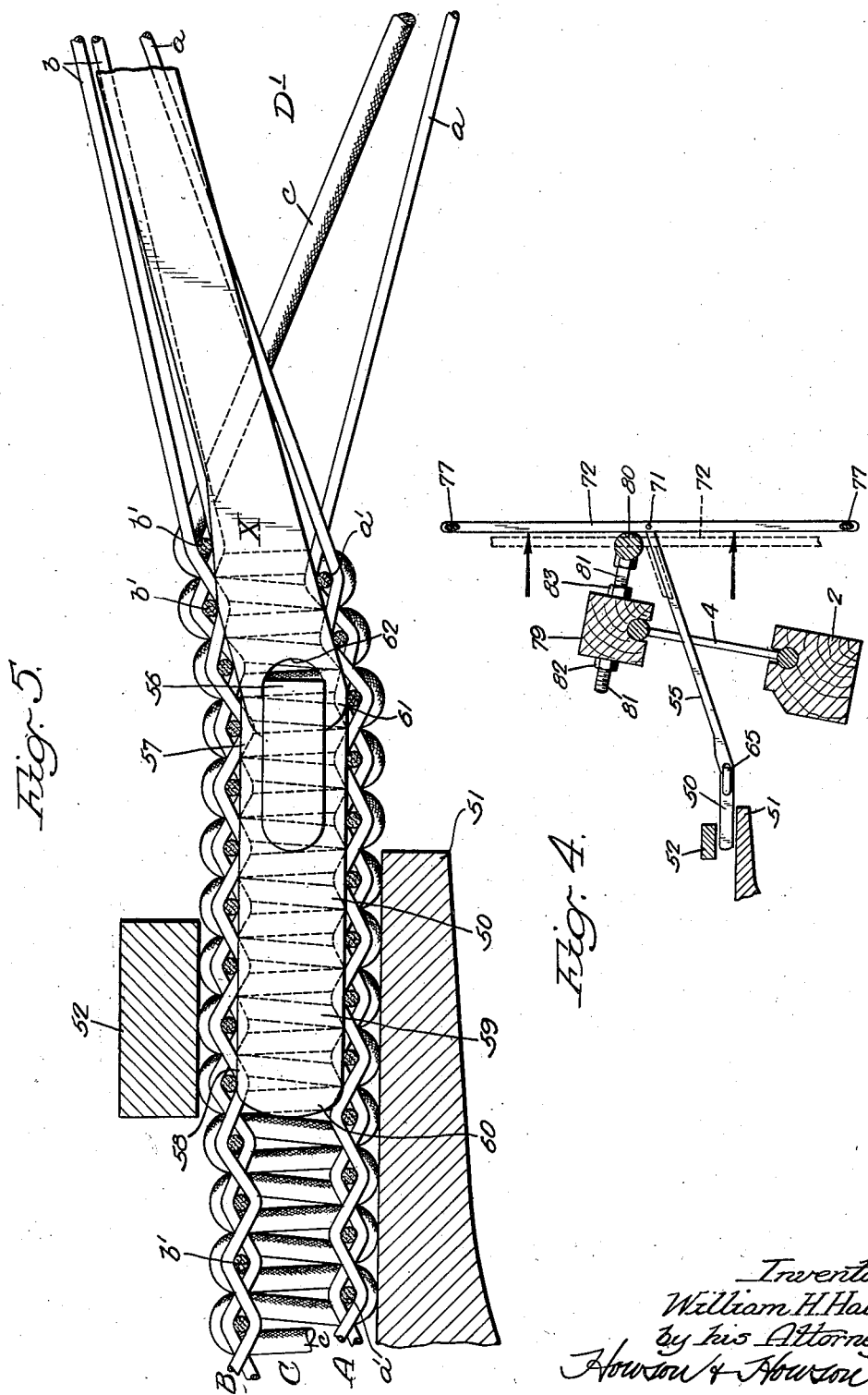
Inventor:
William H. Hall Jr.
by his Attorneys
Howson & Howson

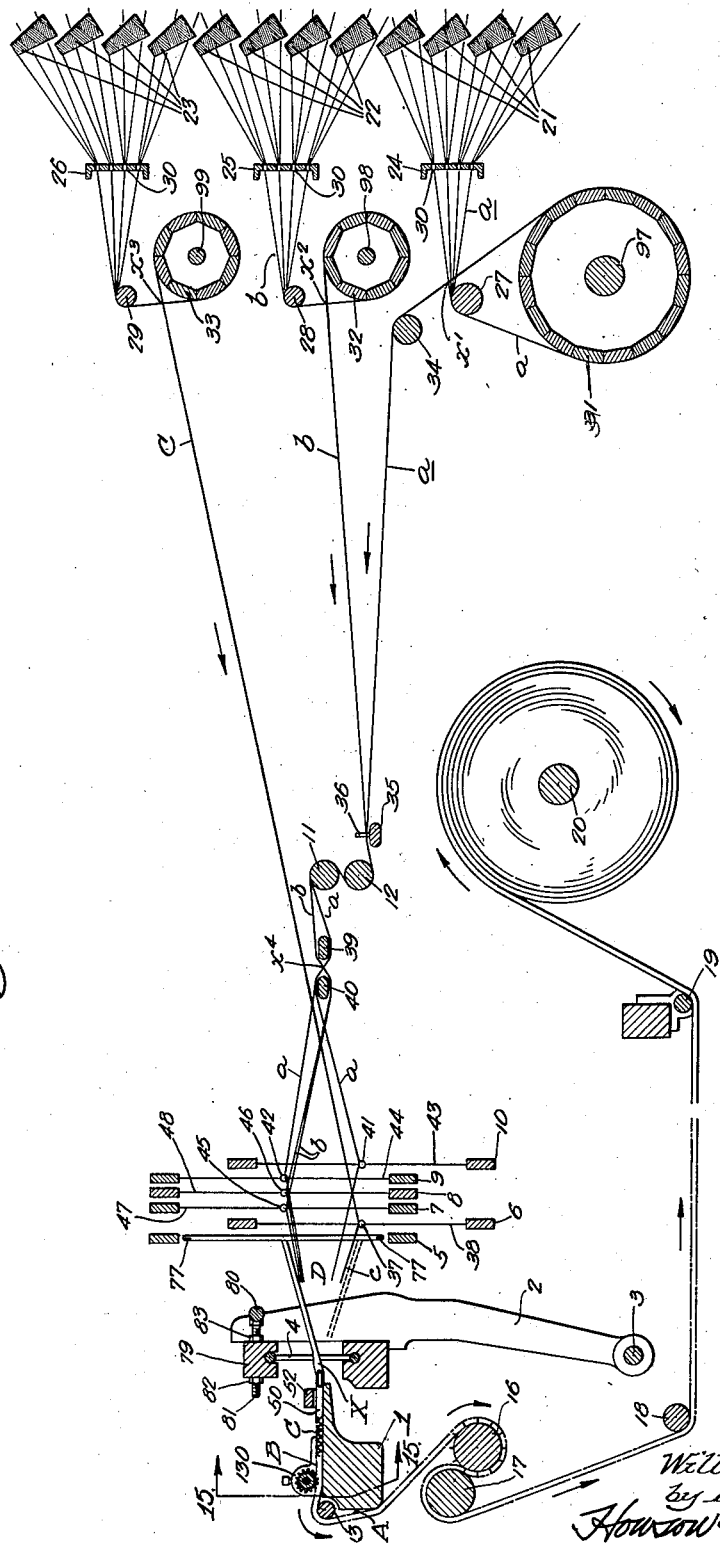

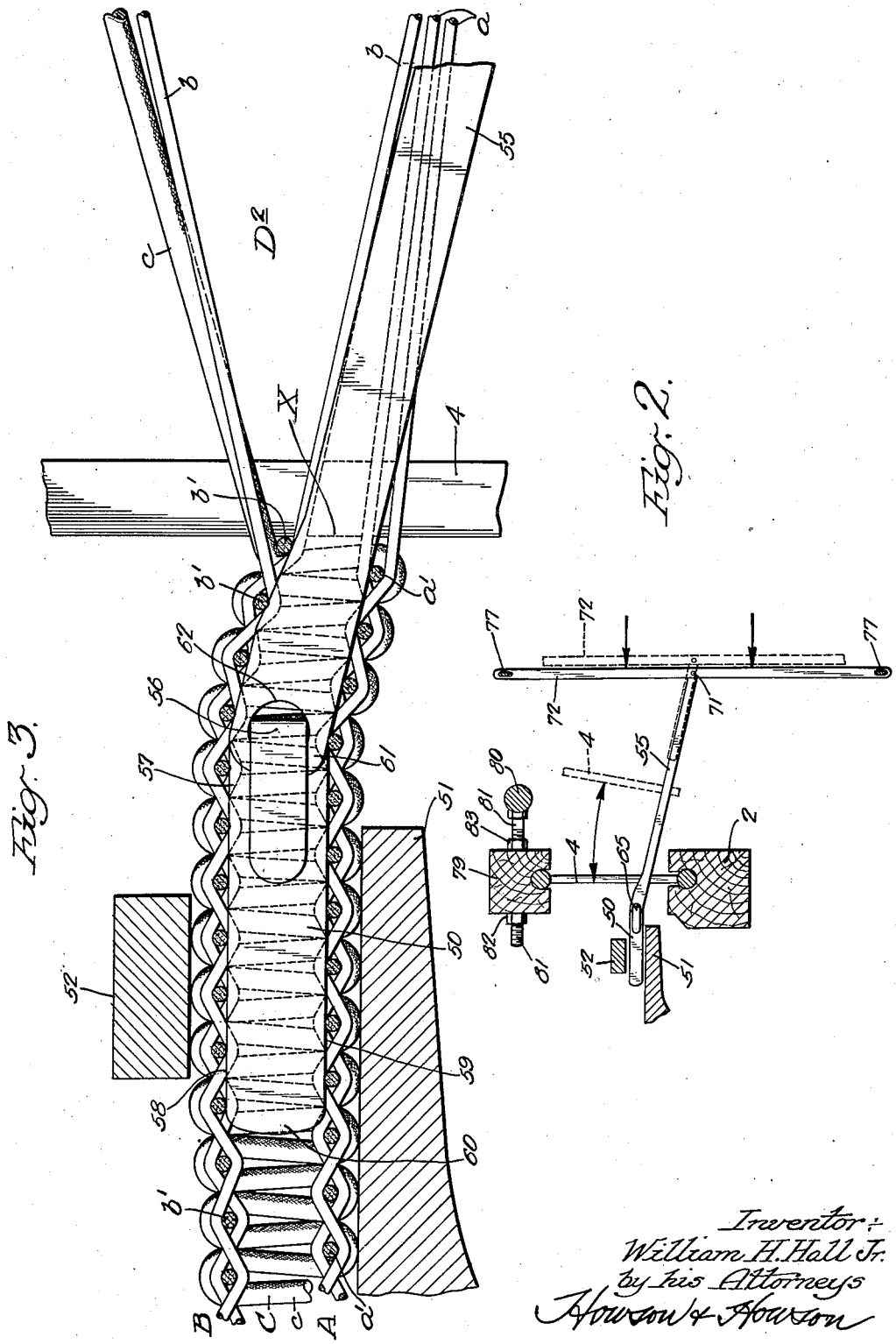

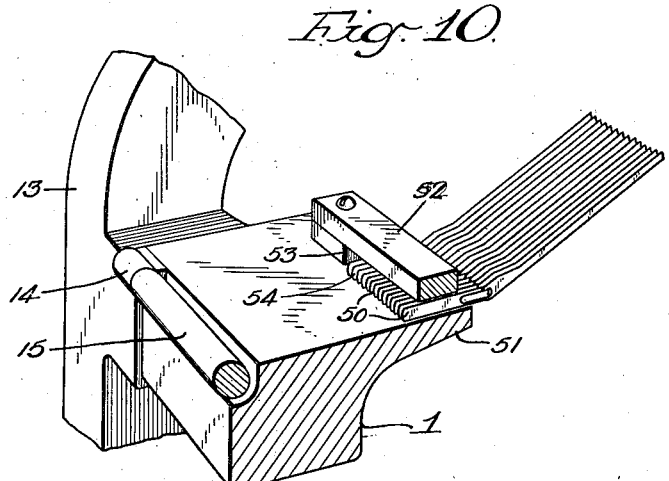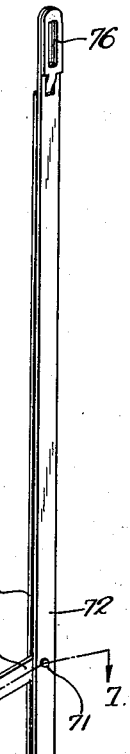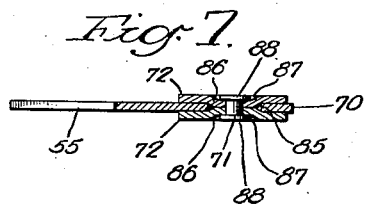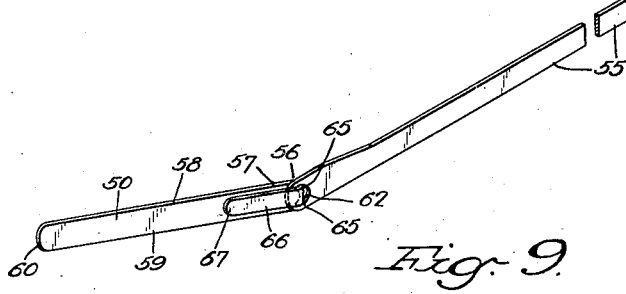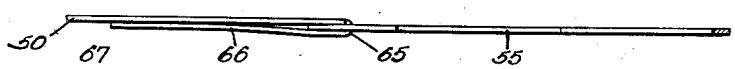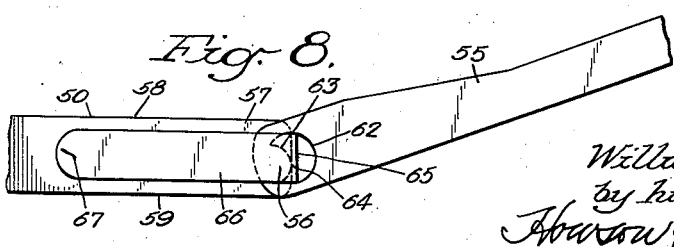

Dec. 27, 1938. W. H. HALL, JR 2,142,025
LOOM
Filed Oct. 13, 1936 8 Sheets-Sheet 5

Inventor:
William H. Hall Jr.
by his Attorneys
Howson & Howson

Dec. 27, 1938.  W. H. HALL, JR  2,142,025
LOOM
Filed Oct. 13, 1936  8 Sheets-Sheet 6
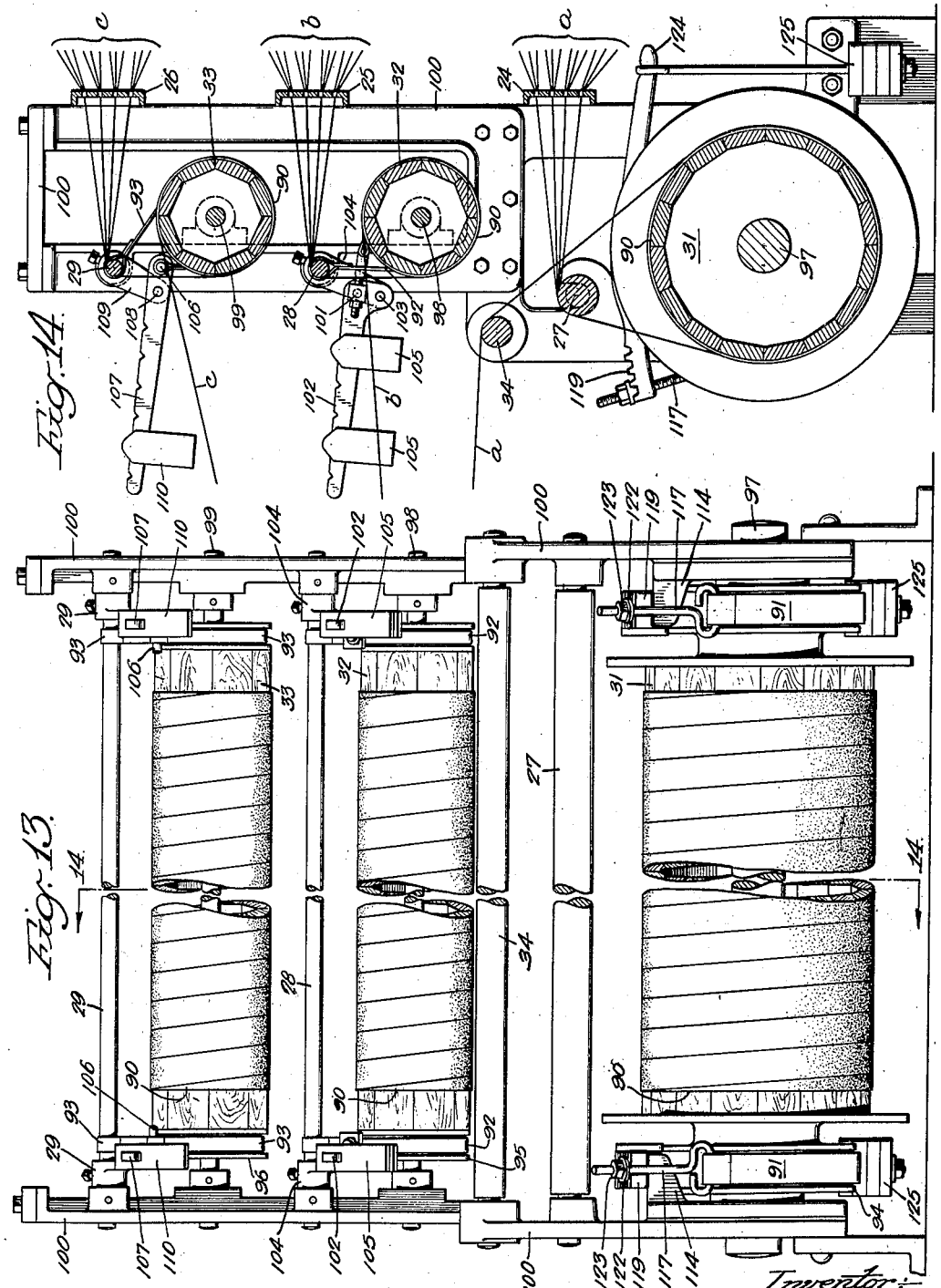

Dec. 27, 1938.   W. H. HALL, JR   2,142,025
LOOM
Filed Oct. 13, 1936   8 Sheets-Sheet 7
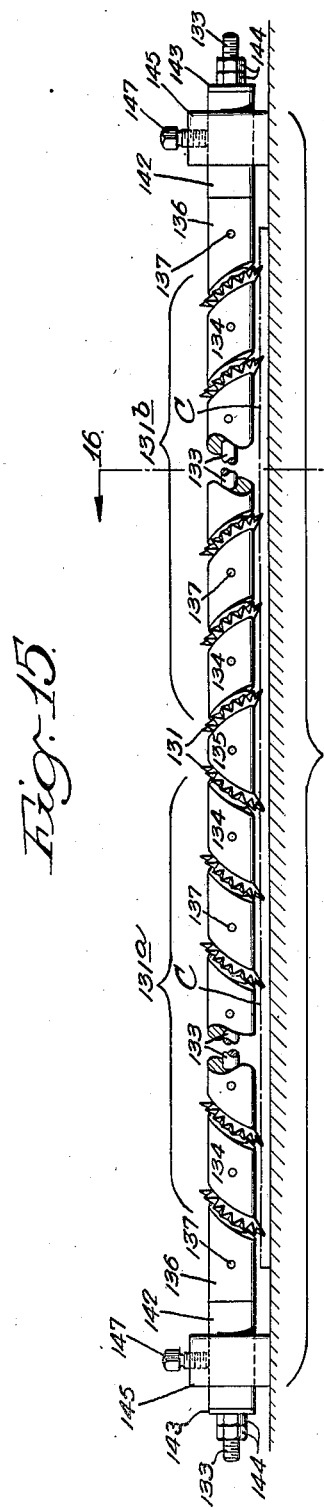
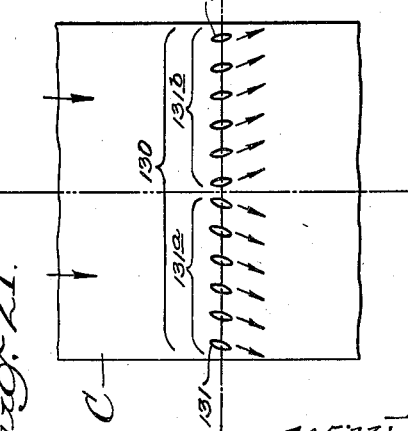
Inventor:
William H. Hall Jr.
by his Attorneys
Howson & Howson Inventor:
William H. Hall Jr.
by his Attorneys
Howson & Howson Patented Dec. 27, 1938

2,142,025

UNITED STATES PATENT OFFICE 2,142,025

LOOM

William H. Hall, Jr., Trenton, N. J., assignor, by mesne assignments, to Thermoid Company, Trenton, N. J., a corporation of Delaware Application October 13, 1936, Serial No. 105,428

5 Claims. (Cl. 139—37)

This invention relates to looms, and more particularly to a loom capable of weaving pile carpet, double, that is, weaving the base fabrics for two independent carpets in superposed relation to each other with pile-forming threads extending from one base fabric to the other base fabric during the course of weaving, and wherein such pile warps are subsequently cut in a plane intermediate the two base fabrics to split the two carpets apart, to produce the cut pile formation on one face of each.

The present invention more especially concerns mechanism adapted to be applied to a loom which is normally intended and equipped solely to weave single ply plain or twill fabric such as heavy canvas or asbestos fabric of the types employed as a base for impregnated brake lining, etc., and which requires but a relatively small rise and fall of the heddles.

One object of the present invention is to convert a loom of the type above noted into one which will be adaptable for the weaving of double pile fabric as above noted.

Another object of the invention is to provide an improved form of separator for the two base fabrics during the weaving of the double pile fabric.

Another object of the invention is to provide an improved method of weaving double pile fabrics in a loom having a small heddle lift when using rigid separators between the base fabrics as noted above.

Subject matter disclosed in this patent and not claimed herein is covered by divisional applications, Serial No. 177,132 and Serial No. 177,133 respectively, each of which was filed on November 29, 1937.

The mechanism forming the subject matter of the present invention and its co-operation and coordination with other normal elements of the loom of the type noted will be fully disclosed hereinafter, reference being had to the accompanying drawings, of which:

Fig. 1 is a longitudinal sectional elevation, in more or less diagrammatic form, illustrating the mechanism of the present invention applied to a loom of the type noted and showing the lay of the loom in the beat-up or front-center position with the reed immediately adjacent the fell of the carpet;

Fig. 2 is an enlarged fragmentary view illustrating the lay in the same position as in Fig. 1;

Fig. 3 is a still greater enlargement at and immediately surrounding the fell of the fabric being woven, with the lay in the beat-up position shown in Figs. 1 and 2 and the carpet in longitudinal section;

Fig. 4 is a view similar to Fig. 2, showing the lay in the back-center or filling position;

Fig. 5 is a view similar to Fig. 3 and illustrating the relation of the warp threads and fabric-spacing elements in the position assumed thereby when the lay is in the back-center or filling position illustrated in Fig. 4;

Fig. 6 is a detached perspective view of one of the fabric-spacing elements and the heddle by which said element is controlled;

Fig. 7 is a sectional view taken on the line 7—7, Fig. 6;

Fig. 8 is an enlarged side elevation of the joint between the two relatively movable parts of the fabric-spacer illustrated in Fig. 6;

Fig. 9 is a plan view of the joint shown in Fig. 8;

Fig. 10 is a sectional perspective view illustrating the mounting for the forward ends of the fabric-spacing elements illustrated in Fig. 6;

Fig. 13 is a front elevation of the warp-tensioning mechanism shown in Fig. 11;

Fig. 14 is a vertical sectional elevation taken on the line 14—14, Fig. 13;

Fig. 15 is a sectional elevation taken on the line 15—15 and illustrating mechanism for spreading the fabric laterally;

Fig. 16 is an enlarged sectional elevation taken on the line 16—16, Fig. 15;

Fig. 21 is a diagammatic plan view showing the spreading mechanism in relation to the fabric as the fabric is being woven.

Figures 11, 12:
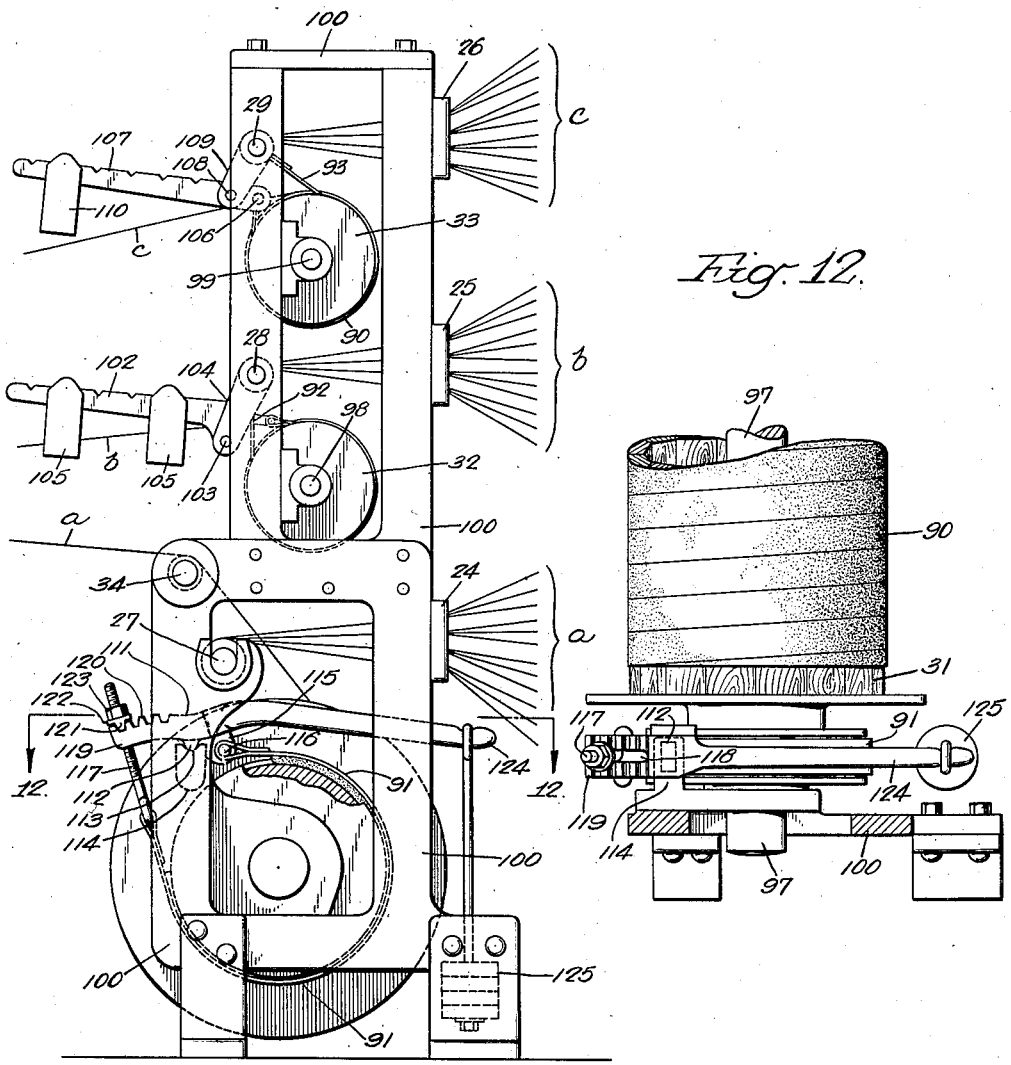
Fig. 11 is a side elevation partly in section of the warp-tensioning mechanism forming a part of the present invention.
Fig. 12 is a sectional plan view taken on the line 12—12, Fig. 11.
Figure 17:
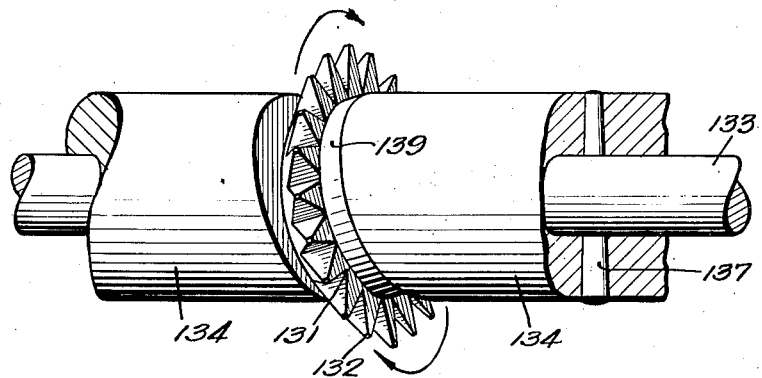
Fig. 17 is a fragmentary plan view of the mechanism shown in Figs. 15 and 16.
Figure 18:
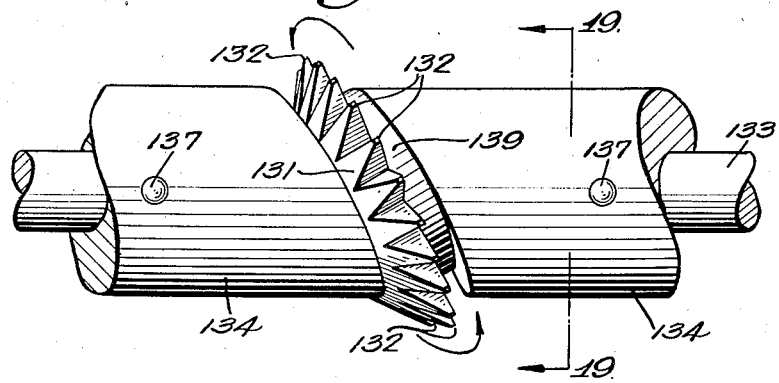
Fig. 18 is a front elevation of the mechanism shown in Fig. 17.

A loom of the type above noted normally comprises a breast beam 1, a lay 2 which is pivoted at 3 to the frame of the loom. The lay 2 is provided with the usual reed 4. The lay 2 is normally rocked about the pivot 3 by a crank shaft (not shown) connected to the lay by the usual form of connecting rod. When the reed is in the beat-up or front-center position shown in Figs. 1 and 2 the crank and connecting link are fully extended with the axis of the pivot between the connecting link and the lay, the axis of the pivot between the connecting link and the crank, and the axis of the crank shaft itself all lying in a straight line. As the crank shaft revolves to the extent of 180° the lay 2 is moved thereby to the back-center position, wherein the above noted axes are again in line, with a line extending from the axis at one end of the connecting link to the axis at the opposite end thereof lying across the axis of the crank shaft.

The loom also normally includes a series of heddle frames illustrated at 5, 6, 7, 8, 9 and 10 respectively. These heddle frames are normally raised and lowered in predetermined relationship to each other while the lay is in the front-center position, in order to provide an open warp shed for the reception of the filling shuttle which is shot transversely across the loom when the lay moves again to the back-center position above noted.

The raising and lowering of the heddle frames 5 to 10 inclusive, in predetermined relationship to each other, is normally produced by a series of cams individual to the heddle frames and mounted on a common shaft which is driven at a predetermined speed with respect to the oscillations of the lay 2. This mechanism is common in the type of loom noted and is well known to those familiar with the weaving art and for that reason has not been illustrated in the present instance.

The loom also includes the usual whip roll 11 and warp guide roll 12 about which the warp threads pass in normally extending from a warp beam at the rear of the loom to and through the heddles of the frames 5 to 10 inclusive and through the dents in the lay reed 4, to the fell of the fabric at the front of the loom.

On the front upper corner of the breast beam 1 and extending transversely of the loom, and normally mounted for rotation in suitable bearings 13 carried by the breast beam 1 or by the main frame 14 of the loom, as illustrated in Fig. 10, is a guide roll 15 over which the finished fabric passes.

The loom also includes the usual form of pin roll 16 and guide roll 17 around which the fabric also passes. The fabric is taken up intermittently, i. e., for each beat-up motion of the lay or for each pick, by the pin roll 16, which maintains the fabric and the warp threads under tension. The rolls 16 and and 17 are suitably mounted for rotation in the side frames 14 of the loom.

The loom is also provided with fabric guide rolls 18 and 19 and a mandrel 20 on which the completed fabric is wound, said mandrel being driven in any suitable manner to wind the fabric step by step as it is advanced from the fell by the intermittent movements of the pin roll 16.

In the present instance, the warp beam is supplanted by a suitable rack of any well known type and upon which is mounted a series of cones, bobbins, spools or other yarn packages 21, 21 containing warp threads $a$, which, as will be more fully disclosed hereinafter, constitute the warp threads for the lowermost of the two base fabrics. The rack also supports a series of yarn packages 22 which supply threads $b$, which constitute the warp threads for the uppermost base fabric. Also carried by the rack is a plurality of yarn packages 23 which supply the pile warps $c$. The pile warps $c$ are adapted to be interwoven with each of the base fabrics and to extend from one to the other thereof in a manner hereinafter described more fully.

The warps $a$, $b$ and $c$ respectively pass through guide or separating plates 24, 25 and 26 from the bobbins 21, 22 and 23 respectively to guide rolls 27, 28 and 29. The guide plates 24, 25 and 26 are provided with suitable relatively spaced openings or perforations 30 through which the warp threads $a$, $b$ and $c$ pass and by which the threads of each group thereof are retained in predetermined relation to each other for presentation to the guide rolls 27, 28 and 29. From the guide rolls 27, 28 and 29 the groups of warp threads $a$, $b$ and $c$ pass around tensioning rolls 31, 32 and 33 respectively.

From the tensioning roll 31 the warp threads $a$ pass to and around a guide roll 34 and in so doing said warp threads pass through and between the threads $a$, where said group of threads are passing from the guide plate 24 to the guide roll 27, as indicated at $x^1$ in Fig. 1. The threads $a$ pass from the guide roll 34 to and over a fixed supporting bar 35, which is disposed adjacent and parallel to the guide roll 12.

The bar 35 is provided with a series of vertical pins 36 which are spaced apart longitudinally of the support 35 which latter extends transversely of the loom and is supported in any suitable manner by the main frames 14 of the loom.

The warp threads $b$ pass from the tensioning roll 32 through that portion of the group of threads $b$ which is stretched between the guide roll 28 and the tensioning roll 32, as indicated at $x^2$, said threads $b$ then passing to the support 35 and between the guide pins 36 thereon, which maintain the threads $b$ in predetermined relation to the thread $a$ for delivery to the guide roll 12 and whip roll 11 of the loom.

The pile warp threads $c$ pass from the tensioning roll 33 through the group $c$ where said group extends from the guide roll 29 to the tension roll 33, as indicated at $x^3$ in Fig. 1. The pile warp threads $c$ pass from the intersecting point $x^3$ directly to and through heddle eyes 37. The heddle eyes 37 are carried by heddle wires 38 which in turn are carried by the heddle frame 6, in the present instance, said threads passing from the heddle eyes 37 to the fell X of the fabric, as illustrated in Figs. 3 and 5.

From the whip roll 11 the warp threads $a$ and $b$ respectively pass under and over a separating bar 39, then over and under a second separating bar 40. The two groups of threads cross each other and pass through each other between the bars 39 and 40 at the intersecting points $x^4$ as illustrated in Fig. 1. From the bar 40 the warp threads $a$ pass to and through heddle eyes 41 and 42 carried by heddle wires 43 and 44 respectively. The wires 43 and 44 are carried by the heddle frames 9 and 10 respectively. The warp threads $a$ pass from said heddle eyes 41 and 42 through the dents in the reed 4 of the lay 2, to the lower base fabric A at the fell X.

The warp threads $b$ pass from the separating bar 40 to heddle eyes 45 and 46 which are carried by heddle wires 47 and 48. These heddle wires are carried by the heddle frames 7 and 8 respectively. The warp threads $b$ pass from the heddle eyes 45 and 46 through the dents in the lay reed 4 to the upper base fabric B at the fell X.

The fabrics A and B are maintained in vertically spaced relation to each other by separating blades 50, said blades being arranged in laterally spaced relation to each other, as illustrated in Fig. 10, and disposed horizontally between a rearwardly projecting lip 51 of the breast beam 1 and a transversely extending bar 52 which is arranged above and in spaced relation to the upper surface of the breast beam to provide a guideway 53 for the separating blades 50.

The blades 50, 50 extend longitudinally of the loom and are arranged to move longitudinally through the guideway 53, with the fabrics A, B, during the beat-up movement of the lay to the front-center position and to be retracted slightly in the opposite direction during the movement of the lay to the back-center position, as will be more fully disclosed hereinafter.

The separating blades are of a width corresponding to twice the height of the pile required on each of the fabrics A and B, said separating blades being arranged in vertical planes and spaced laterally as illustrated in Fig. 10 to provide spaces 54 therebetween and through which the pile warps c pass in extending from the lower base fabric A to the upper base fabric B and vice versa to produce the interconnecting pile area C between said fabrics A and B.

The groups of body or ground warp threads $a$ and $b$ are sub-divided into two substantially equal series which as the heddle frames rise and fall during the course of the weaving operation are alternately raised and lowered to produce an open warp shed D through which the weft or filling threads $a^1$, $b^1$ of the fabrics A and B are alternately inserted by a single shuttle (not shown) which is propelled through the successive warp sheds D by the usual picking mechanism of the loom.

The heddle cams are so arranged that a warp shed $D^1$ (Fig. 5) is first produced by raising all of the warp threads $b$ and one-half of the warp threads $a$, the other half of the warp threads $a$ and the pile warps $b$ being lowered, as shown in Fig. 5, and producing the warp shed $D^1$ for receiving one of the weft or filling threads $a^1$ of the lower fabric A.

After insertion of the filling or weft thread $a^1$ the warp shed changes from that shown in Fig. 5 to that shown in Fig. 3, wherein all of the warp threads $a$ and one-half of the warp threads $b$ are lowered and one-half of the warp threads $b$ and all of the pile warps $c$ are raised to produce the open warp shed $D^2$, shown in Fig. 3, for the reception of one of the wefts $b^1$ of the upper fabric B.

After the insertion of each weft $a^1$ or $b^1$, as the case may be, the lay 2 beats up in the usual manner, the blades or wires constituting the reed 4 engaging the last inserted weft, in the manner illustrated in Fig. 3, and holding it in position at the fell X as the heddle frames change positions to produce the next warp shed for the introduction of the next filling thread $a^1$ or $b^1$, as the case may be.

It will be noted that all of the weft threads $a^1$ are inserted below the spacing blades 50 and all of the filling threads or weft threads $b^1$ of the upper fabric B are inserted above the spacing blades 50, and in order to accomplish this procedure with the limited rise and fall of the heddle frames available in the loom of the type noted each of the spacing blades 50 is provided with a relatively movable section 55. The movable sections 55, 55 of the spacing blades 50, 50 are pivotally connected at 56, 56 to the back ends 57, 57 of the spacing blade 50, 50 respectively and rise and fall with and in predetermined relation to the warp threads $a$, $b$ and $c$.

As shown in Figs. 3 and 5, the two base fabrics A and B after being woven at the fell X ride longitudinally along the lower and upper edges 59 and 58 respectively of the blades 50. The two base fabrics A and B are separated by the vertical width of the blades 50, which determines the length of the pile tufts to be formed by the pile threads $c$ in each case as the threads $c$, $c$ pass across the pile region C between the two fabrics. The double pile fabric composed of the two base fabrics and interconnecting pile threads rides off the front ends 60 of the spacing blades 50 as the pin roll 16 takes off the fabric, step by step, with the beat-up movements of the lay 2.

The forward ends 61 of the movable sections 55 of the blades 50 are each provided with an opening 62, which, as illustrated in Fig. 8, is of a crescent shape. The forward side of the opening 62 in each instance is provided with an arcuate surface 63 which projects into the opening 62 and engages a forward surface 64 of a tongue 65 which projects laterally from the rear end 57 of each of the blades 50 through the opening 62 formed in the movable section 55 of the blade 50. The tongues 65 are formed integrally with the rear ends 57 of the blades 50 and after passing through the openings 62 in the movable sections 55, the tongues 57 are bent forwardly and lie substantially parallel to the blades 50, as indicated at 66.

The forward ends 67 of the tongue portions 66 project forwardly beyond and terminate in front of the joints 56 formed between the two relatively movable blade sections 50 and 55 so that as the double fabric moves along the blades 50 in the manner above noted and off the ends 60 thereof the pile threads $c$ within the pile region C will slide freely past and over the ends 67 of the blade tongues 66.

The joint 56 constructed in the manner above noted eliminates rivet heads and other means by which the two sections of the blades might be secured together and provides a much stronger joint between the two sections and a more freely rocking motion between the two sections than could be accomplished by the use of ordinary rivets or similar means of connecting the two sections together.

The rear end 70 of the movable section 55 of each spacing blade 50 is pivotally connected at 71 to and between a pair of heddle blades 72, 72. The control blades 72, 72 extend vertically and are disposed in laterally spaced relation to each other within the plane of the heddle frame 5 which, as noted in Fig. 1, is the first of the heddle frames and is disposed immediately behind the lay 2 when said lay is in its back-center position above noted.

Each of the heddle blades 72 is provided at one end with an elongated slot 73 and at its opposite end with a head 74. The head 74 in each instance is connected to the end of the heddle blade by a neck 75. Each neck 75 is of a width less than the width of the heddle blade and corresponds substantially to the width of the slot 73 formed in the opposite end of the heddle blade. The neck 75 of one heddle blade passes through the slot 73 of the companion heddle blade, with the head 74 of the first blade lying at the opposite side of and immediately adjacent said companion blade 72, as clearly shown in Fig. 6.

Each of the heads 74 is provided with an elongated slot 76 which coincides with the elongated slot 73 in the corresponding end of the companion blade. The aligned slots 73 and 76 receive transversely extending bars 77 (see Fig. 1) which are secured at and, if desired, intermediate their opposite ends to the heddle frame 5 in a manner commonly employed for attaching heddle-supporting bars to heddle frames.

The heddle frame 5 is controlled by one of the cams on the common shaft by which the frames 6 to 10 inclusive are controlled, said frame being movable from a high to a low position and vice versa to carry the movable sections 55 of the fabric-spacing blades 50 up and down between the full and dotted line positions shown in Fig. 1 and which are reproduced in full lines in Figs. 5 and 3 respectively, as the warp sheds $D^1$ and $D^2$ are formed for the introduction of the weft threads $a^1$—$b^1$ respectively.

As previously noted when the lay moves to its front-center position to beat up a newly inserted weft thread and the pin roll 16 advances to take up the fabric to the desired extent, the blades 50, being interwoven with the double pile fabric between the two base fabrics A and B, advance a corresponding distance with the fabric and in order to strip the fabric off the ends 60 of the blades 50, these blades are moved rearwardly, after each beat up movement of the lay, a distance equal to the distance the blades advanced with the fabric.

The retracting of the spacing blades 50 is effected at the time the lay moves into its back-center position and for that purpose the lay is provided with a bar 80 which extends transversely across the loom behind the lay 2 and in front of the heddle frame 5 and which as said lay moves to its back center position engages the forward edges of the heddle blades 72, as clearly illustrated in Fig. 4, which, as the said lay approaches and moves into its extreme back center position exerts a pull on the sections 55 of the spacing blades 50. The rearward pull of the sections 55 of the blades 50 imparts a corresponding rearward movement to the blade 50 through the joint 56 and by which the fabrics A and B are delivered over the forward ends 60 of the blades 50.

The bar 80 may be of any suitable character and may be supported in any suitable manner on the lay 2. In the present instance the bar 80 lies behind and is spaced from the back of the upper reed-supporting rail of the lay 2. In the present instance, the retracting bar 80 is spaced from the top rail 79 of the lay 2 by means of posts 81 which are passed through said rail and are threaded to receive adjusting nuts 82 and 83 respectively lying in front of and behind the reed rail 79, for adjusting the bar 80 relative to the lay and by which the extent of retraction of the blades 50 may be minutely controlled.

In order to prevent shearing of the pin or other means by which the rear ends of the blade sections 55 are pivotally connected to the heddle blades 72, as a result of the impact of the retracting bar 80 with the forward edges of the heddle blades 72, the rear end 70 of each blade section 55 is provided with an opening 85 of a diameter relatively larger than the rivet 71 by which the pile blades 50 are secured to the heddle blades 72. Each of the heddle blades 72 is depressed within the opening 85, as clearly illustrated at 86 in Fig. 7, the depressed portions 86, 86 of the blades 72, 72 being retained in laterally abutting relation to each other immediately around and by the rivet 71, which provides a bearing surface of relatively large diameter between the blade section 55 and the heddle blades 72, 72. Furthermore, the depressions 86, 86 provide cavities 87, 87 in the outer sides of the blades 72, 72 for reception of the heads 88, 88 on the opposite ends respectively of the rivet 71, by which said heads are maintained within the planes of the outside surfaces of the heddle blades 72, 72 against which the warp threads $a$, $b$ and $c$ necessarily rub in passing to the fell of the fabric through the heddle frame 5 from the heddle frames by which said warp threads are respectively controlled and as these threads are raised and lowered in forming the warp sheds D.

In order to produce the necessary tension on the warp threads $a$, $b$ and $c$, the peripheral faces of the tensioning drums 31, 32 and 33 are roughened to grip the threads more securely. In the present instance these rolls are spirally wrapped with strips of abrasive material, such as sandpaper, as indicated at 90 in Fig. 13. The abrasive material, by reason of its rough character, retains a firm grip on said warp threads and prevents relative slippage between the warp threads and the surfaces of the tensioning drums.

As the fabric is woven and taken up by the pin roll 16, the warp threads $a$, $b$ and $c$ are intermittently pulled, which intermittently revolves the tensioning rolls 31, 32 and 33. Such rotation of the rolls 31, 32 and 33 is retarded, to apply the desired tension to the warp threads, by means of brake bands 91, 92 and 93, which are respectively applied to peripheral surfaces of brake drums 94, 95 and 96. The brake drums 94, 95 and 96 are carried by the shafts 97, 98 and 99 which support the drums 31, 32 and 33 respectively. The shafts 97, 98 and 99 are mounted for rotation in and relative to fixed frames 100, 100 by which the tensioning rolls, the spacing bars 24, 25 and 26, and the guide rolls 27, 28 and 29 are supported in predetermined relation to each other.

One end of the brake band 92 is permanently attached to the guide bar 28 around which the warp threads $b$ pass, the opposite end of said brake band being adjustably secured at 101 to a lever 102. The lever 102 is pivoted at 103 to a bracket 104 which in turn is adjustably mounted on the guide bar 28. The arm or lever 102 is provided with adjustable weights 105 by which the braking effort applied to the tension roll 32 may be regulated at will.

One end of the brake band 93 is permanently attached to the guide bar 29 over which the pile warps $c$ pass. The opposite end of the brake band 93 is pivotally connected at 106 to one end of a lever 107. The lever 107 is pivotally mounted at 108 to a bracket 109 which is adjustably mounted on the guide bar 29. The lever 107 is provided with a single weight 110 adjustable longitudinally of the arm 107 for regulating the braking effort applied to the tensioning roll 33.

In order to prevent wrinkling of the under fabric A which apparently is caused by reason of this fabric assuming an arc of smaller radius than that assumed by the fabric B in passing around the breast beam roller 15, it has been found necessary to apply a greater tension to the warp threads $a$, of which the groundwork of the fabric A is composed, than is necessary to be applied to the warp threads $b$, forming the ground fabric B, and in order to apply the desired amount of tension to the warps $a$ it has been found necessary to increase the diameter of the tensioning roll 31, around which the threads $a$ pass, over the diameter of the roll 32 for the threads $b$, in order to grip each thread $a$ throughout a greater portion of its length than is required in the case of the threads $b$, in order to withstand the increased tension without slipping on the roll 31.

A relatively different form of braking mechanism has also been employed in connection with the tensioning of the threads a, said braking mechanism comprising, as shown particularly in Figs. 11, 12 and 13, a lever 111 having a depending transversely elongated lug 112 arranged to rock in a cradle surface 113 formed in the upper edge of a bracket 114 carried by the side frame 100 of the tensioning device. The lever 111 is provided with a pair of laterally spaced depending lugs 115 between which extends a rod 116 to which one end of the brake band 91 is secured. The opposite end of the brake band 91 is provided with a threaded shackle bolt 117 which passes through a slot 118 formed in one end of the lever 111. At the opposite sides of the slot 118, the end 119 of the lever 111 is provided with a series of teeth 120. The teeth 120 are adapted to receive a tooth 121 formed on each side of the plate 122 through which the shackle bolt 117 passes. Threaded onto the shackle bolt 117 is a nut 123 which is arranged to be screwed down against the plate 122 for effecting minute adjustment of the brake band 91. The opposite end 124 of the lever 111 supports suitable weight 125 and which in rocking the lever 111 about its pivot 112 applies the necessary retarding force to the rotation of the tensioning roll 31.

At times, during the weaving of double pile fabric or, and especially, during the weaving of a heading between the ends of two lengths or strips of the fabric, wherein the pile-forming warps are floated beneath the lowermost of the two superposed base fabrics which at that time are being woven more or less as separate fabrics connected together only at the selvage edges thereof by the weft or filling thread woven first into one and then into the other of the base fabrics at alternate picks respectively, the fabric tends to wrinkle in the direction of the warps, i. e., the selvage edges tend to move inwardly toward each other and cause the fabric to become wrinkled therebetween. These wrinkles extend longitudinally of the fabric through the heading and, in some cases, for some distance into the pile section which is woven subsequent to the heading.

In order to overcome the above noted longitudinal wrinkling of the fabric, the loom is provided, between the guide bar 52 for the base fabric spacers 50 and the guide roll 13 over which the composite fabric C passes after weaving, with a spreading device 130.

The spreading device 130 comprises a plurality of peripherally toothed wheels 131 which are spaced apart across the breast beam and disposed in positions to contact with the fabric. The spreader wheels 131 are arranged in two series 131a and 131b. The wheels of each series are disposed in substantially parallel planes with the planes of the wheels of the one series arranged at acute angles to the plane of the fabric and breast plate 1 and pointing toward one edge of the fabric, while the planes of the wheels of the other series are arranged at reversely corresponding acute angles to the fabric and breast plate and point toward the opposite selvage so that the two series are in opposed relation to each other with the planes of the two series of wheels in divergent relation to the longitudinal center line of the fabric and to a vertical plane coincident with the longitudinal center line of the fabric, i. e., a line substantially equidistant from the oppositely disposed selvages of the fabric.

Each wheel 131 is provided around its periphery with a series of radially extending circumferentially spaced teeth 132 which are adapted to engage the fabric C, for example, inside relatively spaced chain warps b—b respectively of the upper base fabric B, between successive wefts $b^1$—$b^1$ thereof; and when the heading is being woven the teeth 132 may project through the top base fabric B into the lower base fabric A and engage the chain warps and wefts thereof in a similar manner. In either case the divergent relation of the wheels, as the fabric C is taken up step by step by the pin roll 16 keeps spreading the fabric laterally from the center line thereof toward the opposite selvage edges thereof.

A valuable advantage of the above resides in the fact that in addition to keeping the fabric from wrinkling it permits the use of a lesser number of warp ends across the fabric to maintain a predetermined width to the fabric than can normally be used to produce a fabric of equal width, with a resulting saving in the cost of material to the manufacturer.

The wheels 131 are each mounted for free rotation on and about the axis of a common supporting shaft or tie rod 133 and are held in definite spaced relation to each other along said shaft by spacing sleeves 134, 134, a center sleeve 135, and end sleeves 136, 136, all of which are secured to the tie rod 133 as by tapered dowel pins 137.

The opposite ends of the spacing sleeves 134 are cut at corresponding and parallel angles to the axis of the sleeve and the ends of the central sleeve 135 are cut at corresponding angles arranged in opposed relation to each other. The angular ends of adjacent spacer sleeves hold the spreader wheels definitely in the divergent planes desired and permit the wheels to turn freely.

Figure 20:
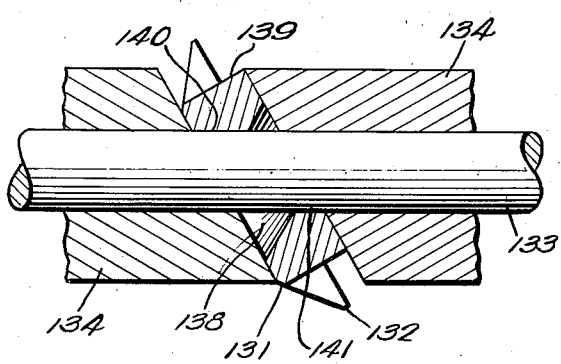
Fig. 20 is a longitudinal sectional elevation taken on the line 20—20, Fig. 19.
Figure 19:
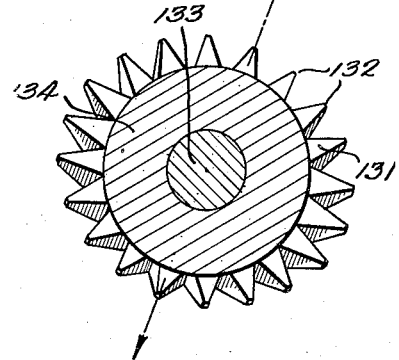
Fig. 19 is a transverse sectional elevation taken on the line 19—19, Fig. 18.

In order to permit the wheels 131 to turn freely on the tie bar 133 while arranged at an angle to the axis of the tie bar the body portion of each wheel is provided with a frusto-conical bore 138 having the larger diameter end or mouth of the conical opening disposed at one end of the wheel and the smaller diameter end or throat of the conical opening disposed at the opposite end of the wheel, or, in some instances, for example as shown in Fig. 20 where the wheel is provided with an axial extension or hub 139, at a plane intermediate the opposite ends of the wheel, with a similar frusto-conical opening extending inwardly from said opposite end of the wheel and having its smaller diameter end coinciding with the smaller end of the first said conical opening at said intermediate plane. In such case, each wheel 131 has a pair of bearing surfaces 140 and 141 respectively contacting the upper and lower sides of the tie rod 133 and permitting the wheel to turn about an axis common to both of the opposed conical ends of the bore at an angle to the axis of the tie rod 133.

At each of the opposite ends of the spreading device 130 there is a cylindrical sleeve 142 which encircles the tie rod 133 beyond the end sleeves 136, 136 respectively. The sleeves 142, 142 may or may not be doweled to the rod 133 as desired.

In the present instance, the cylindrical sleeves 142 are gripped between the end sleeves 136, 136 and washers 143, 143 on the tie rod 133 by nuts 144, 144 threaded onto the opposite ends respectively of the tie rod 133.

The cylindrical sleeves 142, 142 are mounted in bearings 145, 145 respectively which are secured to the breast beam 1 by screws 146, 146.

The sleeves 142, 142, and consequently the whole of the assemblage mounted on the tie rod 133 is adjustable axially and rotationally in the bearings 145 to vary the angle of divergency of the spreader wheels 131 with respect to the center line of the fabric.

The wheels 131 are maintained in their adjusted positions by set screws 147, 147 threaded into the bearings 145, 145 and engaging the cylindrical sleeves 142, 142 respectively.

The double pile fabric is woven in a continuous strip which is made possible by the warp threads being drawn from individual packages, making it possible to replenish the warp threads at any time and in any numbers so that the knots made in tying the threads of new packages to the threads of depleted packages are distributed throughout the length of the continuous strip of fabric.

In order to receive the fabric from the loom the strip is cut transversely when the roll on the mandrel 20 is of a predetermined size containing a predetermined number of yards. In order to provide for such cutting and in order to facilitate the splitting operation, wherein the two strips of double woven fabric are split apart in a plane intermediate the planes of the two base fabrics, non-pile headings are made periodically in the continuous strip by dropping the pile warps below the lower base fabric and not weaving these threads into either of the base fabrics.

The dropping of the pile warps to non-weaving position during the weaving of a heading is accomplished by rendering inoperative the means by which the heddle frame which controls the pile warps is raised and lowered. In different looms this would be accomplished in different ways. In looms of the type to which the present case is directed rendering of the pile-lifting means ineffective is accomplished merely by holding a cam follower out of contact with a cam by which the pile warps are normally raised.

I claim:

1. In a loom for weaving double pile fabric composed of two vertically spaced base fabrics respectively comprising longitudinal warps and transverse wefts with pile warps interwoven with each and extending from one to the other of said base fabrics, a series of spacer blades each comprising a section bound in said fabric between said base fabrics and said pile warps and a relatively movable section operatively connected to said bound in section and projecting warpwise beyond the fell of said fabric, heddle frames for raising and lowering said warp threads and a heddle frame for raising and lowering the projecting ends of said spacer blades in predetermined relation to each other to form open sheds for the insertion of said wefts above and below said spacer blades, means for operatively connecting said spacer blade sections to the actuating heddle frame therefor comprising a pair of heddle blades for and located at opposite sides respectively of each of said movable sections and carried by said spacer blade actuating heddle frame, means passing through each of said movable sections and its pair of heddle blades for pivotally connecting said spacer blade movable sections to said heddle blades, a lay for beating said wefts up to said fell, and means carried by said lay and arranged to engage each pair of said heddle blades simultaneously to retract said spacer blades to strip the fabric from said spacer blades.

2. The combination of a spacer blade, an extension blade pivotally connected at one of its ends to one end of said spacer blade for relative movement with respect thereto substantially in the plane thereof, a pair of control blades disposed at opposite sides of said extension blade and pivotally connected to the opposite end of said extension blade, said extension blade having an opening in said opposite end thereof, depressions formed on said control blades respectively and projecting into the opening in said extension blade, and a rivet passing through said control blade depressions to secure said depressions in abutting relation to each other within said opening and forming a pivot bearing between said extension and control blades.

3. The combination of a spacer blade, an extension blade pivotally connected at one of its ends to one end of said spacer blade for relative movement with respect thereto substantially in the plane thereof, the pivot between said blades comprising a tongue formed on one of said blades and extending laterally therefrom into a crescent shaped opening formed in the other of said blades, and a curved rocker surface formed by one side of said crescent shaped opening and engaging a relatively flat surface on said tongue.

4. The combination of a spacer blade, an extension blade pivotally connected at one of its ends to one end of said spacer blade for relative movement with respect thereto substantially in the plane thereof, the pivot between said blades comprising a tongue formed on one of said blades and extending laterally therefrom into a crescent shaped opening formed in the other of said blades, and a curved rocker surface formed by one side of said crescent shaped opening and engaging a relatively flat surface on said tongue, said tongue comprising a free end portion extending from and substantially at right angles to said lateral portion thereof in substantially parallel contacting relation to the blade on which said tongue is formed to maintain said blades in said operative relation to each other.

5. The combination of a spacer blade, an extension blade pivotally connected at one of its ends to one end of said spacer blade for relative movement with respect thereto substantially in the plane thereof, the pivot between said blades comprising a tongue formed on one of said blades and extending laterally therefrom into a crescent shaped opening formed in the other of said blades, and a curved rocker surface formed by one side of said crescent shaped opening and engaging a relatively flat surface on said tongue, said tongue comprising a free end portion extending from and substantially at right angles to said lateral portion thereof in substantially parallel contacting relation to said spacer blade to maintain said blades in said operative relation to each other, said free end portion extending longitudinally of said spacer blade toward that end thereof which is opposite to the end to which said extension blade is secured.

WM. H. HALL, Jr.